United States Patent
Deselaers et al.

(10) Patent No.: US 9,536,180 B2
(45) Date of Patent: Jan. 3, 2017

(54) TEXT RECOGNITION BASED ON RECOGNITION UNITS

(71) Applicant: Google Inc., Mountain View, CA (US)

(72) Inventors: Thomas Deselaers, Zurich (CH); Daniel Martin Keysers, Stallikon (CH); Dmitriy Genzel, Mountain View, CA (US); Ashok Chhabedia Popat, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 14/142,967

(22) Filed: Dec. 30, 2013

(65) Prior Publication Data

US 2015/0186738 A1     Jul. 2, 2015

(51) Int. Cl.
*G06K 9/62*     (2006.01)
*G06K 9/72*     (2006.01)
*G06F 17/22*     (2006.01)

(52) U.S. Cl.
CPC .............. *G06K 9/723* (2013.01); *G06F 17/22* (2013.01); *G06K 2209/013* (2013.01)

(58) Field of Classification Search
CPC .. G06K 9/18; G06K 9/00852; G06K 9/00859; G06K 9/00865; G06K 9/00872; G06K 9/00879; G06K 9/66; G06F 17/22; G06F 17/2217; G06F 17/2223; G06F 17/2229; G06F 17/2264; G06F 17/2276; G06F 17/2282
See application file for complete search history.

(56) References Cited

U.S. PATENT DOCUMENTS

| | | | |
|---|---|---|---|
| 6,370,269 B1 * | 4/2002 | Al-Karmi | G06K 9/00879 382/186 |
| 6,882,970 B1 | 4/2005 | Garner et al. | |
| 7,295,980 B2 | 11/2007 | Garner et al. | |

FOREIGN PATENT DOCUMENTS

WO     2006/075001     7/2006

OTHER PUBLICATIONS

Fischer et al., "Ground Truth Creation for Handwriting Recognition in Historical Documents", Jun. 11, 2010, ACM, Proceedings of the 9th IAPR Int. Workshop on Document Analysis Systems, p. 3-10.*
Breuel., "Applying the OCRopus OCR System to Scholarly Sanskrit Literature", May 17, 2008, Springer, Lecture Notes in Computer Science, vol. 5402, p. 391-402.*
Natarajan et al., "Multi-lingual Offline Handwriting Recognition Using Hidden Markov Models: A Script-Independent Approach", Sep. 28, 2006, Springer, Lecture Notes in Computer Science, vol. 4768, p. 231-250.*

(Continued)

*Primary Examiner* — Stephen R Koziol
*Assistant Examiner* — Timothy Choi
(74) *Attorney, Agent, or Firm* — Fish & Richardson P.C.

(57) ABSTRACT

Methods and systems for grapheme splitting of text input for recognition are provided. A method may include receiving a text input in a script and segmenting the text input into one or more graphemes. Each of the one or more graphemes may be split into one or more recognition units based on one or more recognition unit identification criteria associated with the script. Next, a text recognition system may be trained using the recognition units. Text input may be handwritten text input received from a user or a scanned image of text.

20 Claims, 4 Drawing Sheets

(56) References Cited

OTHER PUBLICATIONS

Breuel, "Recent Progress on the OCRopus OCR system", Jul. 25, 2009, ACM, Proceedings of the Int. Workshop on Multilingual OCR 2009, article No. 2.*

Ma et al.,"A New Radical-Based Approach to Online Handwritten Chinese Character Recognition", 19th International Conference on Pattern Recognition, pp. 1-4, Dec. 2008.

* cited by examiner

Isolated: 501
Initial: 502
Medial: 503
Final: 504

TEXT RECOGNITION BASED ON RECOGNITION UNITS

BACKGROUND

In general, handwriting recognition is the ability of a computer to receive and interpret intelligible handwritten input from sources such as paper documents, photographs, touch-screens and other devices. Among various recognition techniques, a complete handwriting recognition system also handles formatting, performs correct segmentation into characters and finds the most plausible words. Similarly, optical character recognition (OCR) is the mechanical or electronic conversion of scanned images of typewritten or printed text into machine-encoded text. In handwriting recognition and OCR, the task is to recognize a handwritten sample or a scanned document and provide a Unicode string matching the text as output. During a training phase of handwriting recognition and OCR systems, a received text input may be segmented into graphemes. These grapheme recognition units may be used to train the system and generate a trained text recognition model based on the graphemes for use during a recognition phase in the system for recognizing a received text input. In some cases, however, the graphemes can be long and may present an obstacle during training and/or recognition which can adversely impact the recognition efficiency and computational cost in a text recognition system.

BRIEF SUMMARY

According to an implementation of the disclosed subject matter, a method may include receiving, by a computerized text recognition system, a first text input in a script. One or more labels associated with the first text input may be received. The one or more labels may indicate one or more Unicode codepoints corresponding to the first text input. The one or more labels may be segmented into one or more graphemes. Each of the one or more graphemes may be split into one or more recognition units based on one or more recognition unit identification criteria associated with the script. Next, the computerized text recognition system may be trained using the one or more recognition units.

An implementation of the disclosed subject matter provides a system including a processor configured to receive a first text input in a script. One or more labels associated with the first text input may be received. The one or more labels may indicate one or more Unicode codepoints corresponding to the first text input. Next, the one or more labels may be segmented into one or more graphemes. Each of the one or more graphemes may be split into one or more recognition units based on one or more recognition unit identification criteria associated with the script. Next, a computerized text recognition system may be trained using the one or more recognition units.

Implementations of the disclosed subject matter provide methods and systems for recognition unit splitting of labels associated with received text input for training a text recognition system. Techniques disclosed herein allow for improved recognition of text input using a recognition unit splitting approach for further splitting graphemes into recognition units. By splitting graphemes into smaller recognition units, the disclosed techniques for training a text recognition system based on smaller recognition units results in faster and more accurate text recognition. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

In text recognition, such as handwriting recognition or OCR, the overall task is to recognize a text input with the output being a Unicode string. However, problems can arise in typical text recognition schemes. One problem is that multiple separate entities in a target Unicode string may be grouped together into a single group of strokes that may be better recognized jointly; however, by grouping multiple separate entities together, the computational cost of recognizing such a large group of text may be high. For example, in Devanagari script, a group of multiple Unicode codepoints can form graphemes. Because the presence of one codepoint shapes the form of the group, these graphemes may not be easily separated into the individual codepoints, as shown by the following examples:

त+व =त्व ण+ढ =ण्ढ

स+थ =स्थ क+ ्+ष +ि =क्षि

क+ि =कि

Another problem is that multiple separate entities in a text input may be grouped into a single Unicode character. For example, when recognizing Korean script, the desired output is typically in the form of Hangul characters, e.g. 힌, but the text input may actually contain the subcharacters (called Jamos), e.g., ㅎ, ㅏ, and ㄴ. In this case, multiple separate entities may be grouped into a single output. Again, the computational cost of recognizing a group of multiple separate entities may be high.

A similar case happens when recognizing accented Latin script characters. For example, to recognize an "a-Umlaut", i.e., "ä", rather than recognize the entire Unicode character including both the letter "a" and the umlaut, it may be advantageous to recognize the "a" and the umlaut symbol, separately. In most cases, it is helpful to recognize subcomponents, when different Unicode entities share subcomponents (e.g., symbols) that look similar between different Unicode entities e.g. the umlaut in "ü" and "ä". By recognizing each subcomponent separately, e.g., "a", "u", and the umlaut diacritic, more data may be available during the recognition step and may result in better generalization capabilities by a text recognizer.

Figure 5:
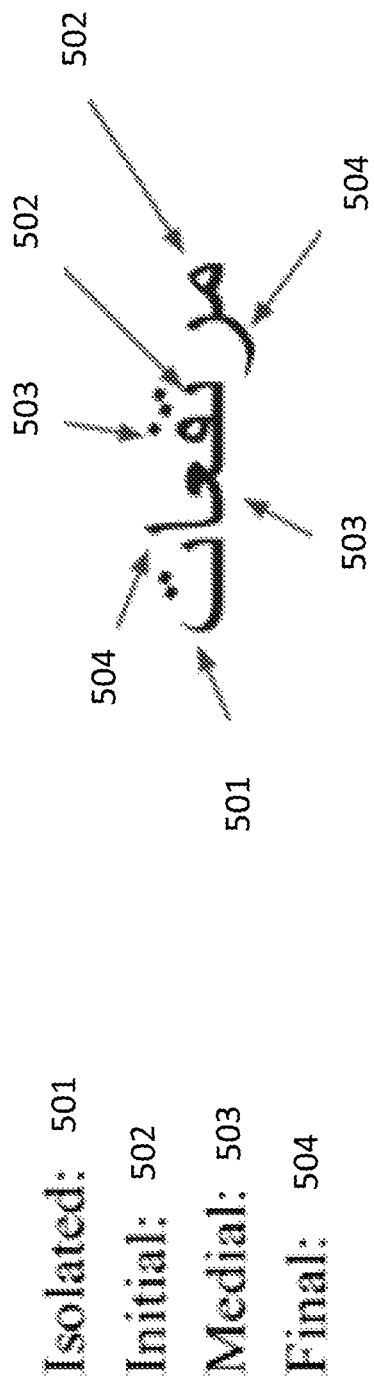
FIG. 5 shows an example Arabic script including individual characters according to an embodiment of the disclosed subject matter.

Yet another problem is that there may be different ways of writing a specific Unicode character which may require proper modeling for good recognition accuracy. For example, in Arabic script, individual characters may have different contextual forms depending on whether they are written in the beginning, middle, or end of a word. However, these different contextual forms of a character are not typically represented in the Unicode form of text. That is, as shown in FIG. 5, the initial 502, medial 503, final 504, and isolated 501 forms of a letter are represented identically in the desired output. In this case, it is desirable to model the individual contextual forms 501, 502, 503, and 504 as separate recognition units.

Taking handwriting recognition as an example, on-line handwriting recognition involves the automatic conversion of text as it is written on device that receives handwritten input, such as where a sensor detects pen-tip movements as well as pen-up/pen-down switching. This data is typically known as digital ink and can be regarded as a digital representation of handwriting. In a handwriting recognition system, groups of ink pieces are typically labeled and mapped to consecutive Unicode points, and based on these Unicode points, the ink pieces are divided into segments to define recognition units. Standard methods such as the library provided by the International Components for Unicode (ICU) are available to group consecutive Unicode points into user-perceived character units, known as graphemes. In general, these graphemes are convenient and natural units of recognition. For some writing systems, however, the graphemes defined based on the conventional ICU manner can be very long, both in terms of Unicode points and the physical size of the corresponding glyph groups. These very long graphemes can present an obstacle in text recognition because there are many possible candidate characters in each grapheme since each grapheme may be a combination of multiple characters and/or symbols in a writing system. This can adversely impact the computational cost of the recognition algorithm since each possible recognition unit in a grapheme is potentially a candidate and must be considered at various positions within a text line.

During training of both handwriting recognition and OCR systems, a text input and one or more labels corresponding to text input (handwritten or a scanned image) may be received. In general, these labels are Unicode strings that may be segmented into graphemes, and these graphemes may be further split into recognition units. The system may learn a text recognition model for each of the recognition units. These recognition units may be Unicode codepoints (e.g. in Latin script), a set of Unicode codepoints (e.g., grapheme recognition units in Indic scripts), or a representation of a part of a Unicode codepoint (e.g. when using Jamos in Korean). The process for training a text recognition system based on recognition units to generate a trained text recognition model may include using forced alignment, during which some parts of the text input may be assigned to each of the recognition units. According to the techniques disclosed herein, training of a text recognition system may allow for sharing of training data among different recognition units, which may result in improved recognition accuracy and efficiency. For example, consider the four words "the", "he", "these", and "this". Each of these words may be represented as a single recognition unit, in which case, the system may only have one training sample for each of the words. However, according to the techniques disclosed herein, each of these words may be split into recognition units, such as the individual letters in each word. As a result, the system may have three training samples for the recognition unit "t", four training samples for the recognition unit "h", four training samples for the recognition unit "e", and the like. Accordingly, the system may be trained based on these recognition units, which may result in generation of an improved model because the system is trained using more training samples per recognition unit.

During recognition, a text recognition system may receive a text input. The text input may be recognized and may produce a label, which may be in the form of a Unicode string. Using the trained text recognition model, the recognition phase may be based on the recognition units. In some cases, the recognition units may already be represented in Unicode codepoints (e.g. in Latin script) or a combination of multiple Unicode codepoints (e.g. grapheme recognition units in Indic scripts). In this case, the final label associated with the received text input may be created by concatenating these recognition units. In other cases, for example, when recognizing Jamos to produce Hangul in Korean, or when recognizing Arabic presentation forms to produce typical Arabic Unicode codepoints, the recognition units may be converted to Unicode codepoints.

In general, the present disclosure provides method and systems for flexible mapping between recognition units, and Unicode codepoints for handwriting recognition and OCR. Based on the script of a text input, the text input may receive one or more labels associated with the text input. The labels may identify one or more Unicode codepoints corresponding to the text input. These labels may be segmented into one or more graphemes, for example based on standard means such as the ICU protocol. Each of these graphemes may be split into one or more recognition units based on recognition unit identification criteria that may be associated with the script of the text input. Next, the one or more recognition units may be used to train a text recognition system. As a result, a trained text recognition model may be generated based on the one or more recognition units. The trained text recognition model may be used by a text recognition system to provide one or more recognized characters corresponding to the received text input.

The techniques disclosed herein for training a text recognition system based on splitting grapheme segments into recognition units may be useful in a text recognition system at various points in such a system. For example, during training of recognizer in a text recognition system, a received label may be split into recognition units and similarly, a desired Unicode label may be converted into recognition units in order to match the format of the recognition units for recognition. As a result, the recognition units may be assigned to the given label based on the recognition units during a forced alignment step. The output of this forced alignment may be used to learn models for the individual recognition units. As another example, during a recognition step in a text recognition system, a text input may be processed by the recognition system resulting in a hypothesized sequence of recognition unit candidates. Since these recognition unit candidates do not necessarily correspond to Unicode codepoints, the recognition unit candidate may have to be converted back to the desired Unicode codepoints before a recognized candidate recognition unit corresponding to the recognition unit may be identified by a text recognition system. As yet another example, during a recognition step in a text recognition system, external knowledge sources such as language models may be used. Language models are typically based on the Unicode codepoint format representation. In order to apply these language models in the disclosed text recognition system based on recognition units, various techniques may be considered. For example, external knowledge sources may be converted into recognition units. As another example, recognition units may be converted into Unicode codepoints in order to consult the external knowledge sources.

Based on the techniques described herein, it is possible to convert between a sequence of Unicode codepoints, such as graphemes, and a sequence of recognition units without considering the received text input. However, the mapping can be flexible and a short grapheme may become a long sequence of recognition units (e.g., as in the case for Korean) or a long grapheme may become a short sequence of recognition units (e.g., as in the case for Devanagari graphemes). As in the Arabic example above, the mapping of the received label to recognition units may be based on the context in the Unicode string and a grapheme may be substituted with multiple recognition units that are unique to the context and portions of characters in the Unicode string. As a result, the present disclosure provides techniques for splitting graphemes into small recognition units which may result in faster and more accurate text recognition. Furthermore, because splitting of graphemes into recognition units may be based on the particular script of the received text input, out of vocabulary errors in the particular script may occur less often because the recognition units used for recognition are smaller and accordingly, there are fewer possible matches with known recognition units during classification.

Figure 1:
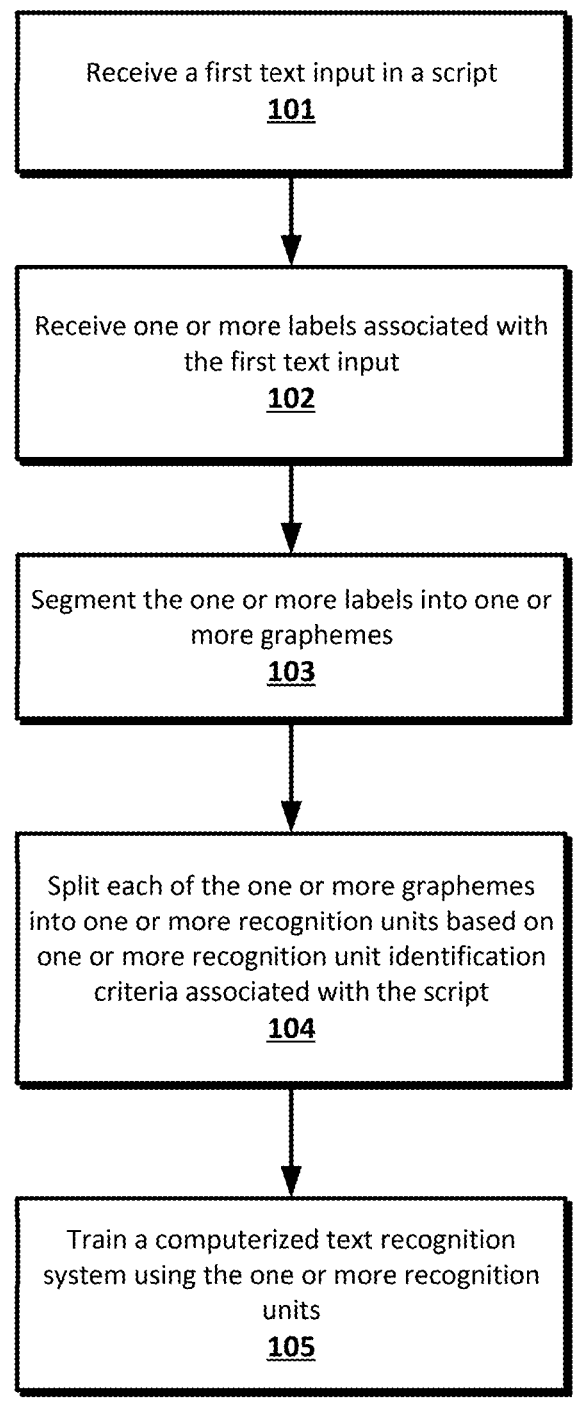
FIG. 1 shows an example process according to an implementation of the disclosed subject matter.

Implementations of the disclosed subject matter provide methods and systems for improved text recognition by splitting grapheme segments into recognition units. FIG. 1 shows an example process according to an implementation of the disclosed subject matter. A system may include a processor configured to receive a text input in a script, at 101. The text input may be any format of text input that may be received by a text recognition system. For example, the text input may be handwritten text input received from a user, a scanned image of text such as handwritten text, typewritten text, printed text, and the like. In some cases, a language associated with the script of the received text input may be identified.

As shown at 102, one or more labels associated with the text input may be received. A label may indicate one or more Unicode codepoints corresponding to the received text input. For example, a label may identify one or more recognized Unicode codepoints associated with the received text input based on a Unicode standard for the script of the text input. At 103, the label may be segmented into one or more graphemes. In general, a grapheme is the smallest semantically distinguishing unit in a written language and may or may not carry meaning by itself. A grapheme may be a character, a letter, a word, a symbol, a syllable, a punctuation mark, a numeral, and any other unit or symbol of a script. Segmenting a label into one or more graphemes may be performed according to various segmenting techniques used in text recognition systems. For example, a label that may be segmented into graphemes based on a standard method such as the ICU library, and the like.

Next, each of the one or more graphemes may be split into one or more recognition units based on recognition unit identification criteria associated with the script, at 104. Identifying a recognition unit may be based on various recognition unit identification criteria. In some cases, the recognition unit identification criteria may be based on the script of the received text input. For example, the recognition unit identification criteria used to identify recognition units in Devanagari script may be different than the criteria used to identify recognition units in Arabic script. An example of a recognition unit identification criterion may be a frequency of occurrence of a recognition unit. As in the case of accented Latin script characters, the umlaut symbol may be a frequently occurring recognition unit in the Latin script, for example since it is used in combination with the letters "a", "e", "i" "o", and "u". Accordingly, the umlaut symbol may be identified as a recognition unit. As such, a grapheme that includes a character including an umlaut symbol may be split into recognition units such that the umlaut symbol is a separate recognition unit from other recognition units resulting from splitting the grapheme. By recognizing the frequently occurring umlaut symbol as a separate recognition unit from each of the characters "a", "e", "i" "o", and "u", recognition accuracy of the umlaut symbol as well as the characters with which it is associated may be improved.

Another example of a recognition unit identification criterion may be a size of a recognition unit. In some cases, a grapheme which is relatively larger than other graphemes in the same script may benefit from being split into smaller recognition units. For example, the average size of a grapheme in a particular script may be two Unicode codepoints. If a segmented grapheme is four Unicode codepoints, this grapheme may be split into two smaller recognition units, e.g., two Unicode codepoints each. This may allow for faster and more efficient processing of each recognition unit as compared to the larger grapheme. Other suitable criteria may be used for identifying recognition units in graphemes by assessing characteristics of the script of a text input.

Referring back to FIG. 1, a computerized text recognition system, for example a recognizer in such a system, may be trained using the one or more recognition units, at 105. In some cases, a trained text recognition model may be generated based on the recognition units. According to an implementation, each trained model may be specific to a particular script. A trained text recognition model may be applied to text input received by the text recognition system and used to provide one or more recognized characters corresponding to the received text input. As an example, one or more labels associated with a received text input may be split into multiple recognition units and each recognition unit (or combination of recognition units) may be classified. As a result of this classification, one or more candidate recognition units may be identified that correspond to the multiple recognition units. As a specific example, a candidate recognition unit may be identified for each recognition unit based on a match between the recognition unit and a known recognition unit in the set of known recognition units. In some cases, each of the candidate recognition units may be combined to generate a recognized string of candidate characters corresponding to the received label. A recognized recognition unit may correspond to one or more recognition units in a label and a set of known recognition units may be a set of Unicode codepoints associated with a script of the text input. The one or more identified candidate recognition units may then be converted to Unicode codepoints. As a result, one or more recognized characters corresponding to the Unicode codepoints may be predicted. These one or more recognized characters may correspond to the received text input and may be provided by the text recognition system. In some cases, the one or more recognized characters may be provided subsequent to training the computerized text recognition system.

In some cases, classifying recognition units may result in a hypothesized sequence of one or more identified recognition unit candidates. Since these one or more identified recognition unit candidates do not necessarily correspond to Unicode codepoints, the identified recognition unit candidates may have to be converted back to corresponding Unicode codepoints before providing one or more recognized characters, corresponding to the one or more recognition units, to a user. Additionally, external knowledge sources such as language models may be used. Language models are typically based on the Unicode codepoint representation. As such, in order to apply these language models to classifying a recognition unit, various techniques may be considered. For example, these external knowledge sources may be converted into recognition units. As another example, recognition units may be converted into Unicode codepoints in order to consult the external knowledge sources.

Figure 2:
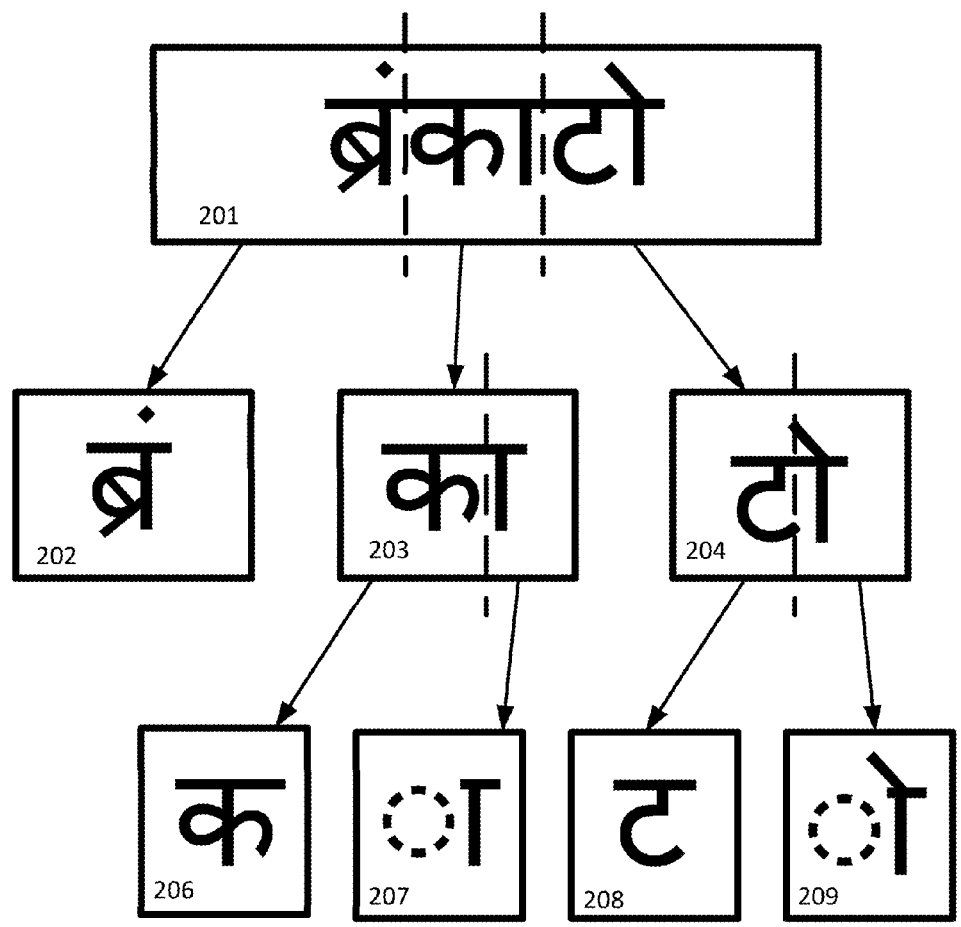
FIG. 2 shows an example label and recognition unit splitting according to an implementation of the disclosed subject matter.

According to an implementation, a method may include receiving a text input in a script and receiving one or more labels associated with the text input. The one or more labels may be segmented into one or more graphemes, and the one or more graphemes may be split into one or more recognition units based on recognition unit identification criteria. FIG. 2 shows an example label associated with a text input and recognition unit splitting according to an implementation of the disclosed subject matter. As shown, a label 201 corresponding to a text input in the Devanagari script may be received. Although not shown in FIG. 2, the label 201 may include on or more labels associated with a received text input. The label 201 may be segmented into graphemes 202, 203, and 204, based on Unicode standard codepoints. In particular, grapheme 202 may correspond to four Unicode codepoints, grapheme 203 may correspond to two Unicode codepoints, and grapheme 204 may correspond to two Unicode codepoints. Based on recognition unit identification criteria associated with Devanagari script, each of the graphemes 202, 203, and 204 may be evaluated to determine whether to further split each grapheme into recognition units.

For purposes of this example, the recognition unit identification criteria for Devanagari script may include a frequency of a recognition unit and a size of a recognition unit. Grapheme 202 may be evaluated to identify whether it includes a frequently occurring recognition unit and/or a recognition unit having a particular size. It may be determined that grapheme 202 does not include any individually frequently occurring recognition units nor does it include a recognition unit of a specific size that would improve recognition if separated. As a result, grapheme 202 may not be split into recognition units. Grapheme 203 may also be evaluated recognition units based on the recognition unit identification criteria. Accordingly, grapheme 203 may be split into recognition units 206 and 207. In particular, it may be determined that recognition unit 206 comprises a relatively large portion of grapheme 203 as compared to the overall size of grapheme 203. In this case, it may be advantageous to split recognition unit 206 in order to improve recognition accuracy by classifying it separately. In addition, it may be determined that recognition unit 207 is a frequently occurring recognition unit in Devanagari script and accordingly, it may be split from the grapheme 203. Similarly, grapheme 204 may be split into recognition units 208 and 209. Each of recognition units 208 and 209 may be frequently occurring recognition units in Devanagari script. In general, frequently occurring recognition units in a script may be identified by ranking all candidate recognition units in a script based on the frequency of occurrence of each candidate recognition unit in graphemes in the script. A threshold number of high ranking candidate recognition units may be identified as being frequently occurring in the script. The threshold number of high ranking candidate recognition units may be based on a recognition unit having a minimum number of total occurrences, a set number of high ranked recognition units (e.g., top 5 frequently occurring recognition units), a percentage of high ranked recognition units (e.g., top 20% of recognition units in the ranked list), and the like. Recognition unit identification criteria may also be based on linguistic information such as identification of vowels or consonants, as well as other information available from the Unicode properties of the codepoint(s).

After grapheme 203 is split into recognition units 206,207 and grapheme 204 is split into recognition units 208,209, a recognizer in a text recognition system may be trained using the recognition units 206, 207, 208, and 209. In an implementation, a text recognition model may be generated based on the recognition units and may be applied to text input received by the text recognition system. As an example, a second text input may be received and one or more labels corresponding to the second text input may also be received. These one or more labels may be segmented into graphemes and these graphemes may be split into one or more recognition units. As a specific example, these one or more recognition units associated with the second text input may be one or more of the recognition units 206,207,208,209. Because the text recognition model has been trained based on the recognition units 206,207,208,209, identification of candidate recognition units and subsequent providing of one or more recognized characters corresponding to the second text input may performed faster and more accurately.

As an example, during application of a trained text recognition model to a received text input in Devanagari script, segmentation and splitting of the received label associated with the text input may result in one or more of the recognition units 206, 207, 208, and 209. The one or more recognition units 206, 207,208, 209 may be classified by comparing each recognition unit with a set of known recognition units in Devanagari script. For example, from among the set of known recognition units in Devanagari script, a hypothesized identified recognition unit candidate may be identified for each of the sub recognition units 206, 207, 208, and 209. It may be the case that these identified recognition unit candidates do not correspond to Unicode codepoints and, accordingly, the identified recognition unit candidates may have to be converted to corresponding Unicode codepoints in order to provide a recognized string of characters to a user. As such, a recognized recognition unit may be provided for each recognition unit based on a match between each recognition unit and the identified recognition unit candidate. In this example, since the candidate recognition units are in the Unicode codepoint format, the grapheme 202 (also in Unicode codepoint format) and the candidate recognition units may be used to predict a recognized string of characters in Devanagari script corresponding to the received text input. Other techniques for applying a trained text recognition model and/or classifying one or more recognition units may be used.

Implementations of the disclosed subject matter may be performed by any suitable system for text recognition.

Examples of text recognition approaches may be Hidden Markov Models (HMMs), Recurrent Neural Networks, and the like. As a specific example, a segment and decode text recognition technique may be used to by a text recognition system that has been trained according to the techniques described herein. Techniques for classifying and/or labeling one or more segments of received text input may be performed by any suitable system such as a machine learning system. In general, a decoding technique may include a search of the best explanation of the overall input taking into account multiple possible segmentations and also other knowledge sources such as a language model. A step of known character matching and/or prediction may or may not be performed for each segment individually, and may be based on the context of all the segments in a text input. Examples of techniques for recognizing a one or more segments of text input may include neural networks, feature extraction, nearest neighbor search, support vector machines, and the like. For example, any of the steps described herein such as receiving a text input, receiving one or more labels associated with the text input, segmenting the one or more labels into graphemes, splitting the grapheme into recognition units based on recognition unit identification criteria, and/or training a text recognition system may be performed by an optical character recognition system, handwriting recognition system, a machine learning system, a recognition system based on a hidden Markov model (HMM) based approach, neural networks, feature extraction, nearest neighbor search, support vector machines, and the like. As described throughout, the present disclosure provides techniques for splitting graphemes into small recognition units which may result in faster and more accurate text recognition.

In an implementation, the communication between a device that can receive a text input and a text recognition provider may be across one or more bridges between the interfaces. For example, the communications between the device and the text recognition provider may be managed or assisted by a third device, such as, a coordinating device, a local coordinator, a remote server, etc. In such cases, the third device may, for example, segment the label into one or more graphemes and provide the graphemes to the text recognition provider, in which case, the text recognition provider may split the graphemes into one or more recognition units based on recognition unit identification criteria and train the text recognition system based on the one or more recognition units. Using a trained text recognition model, the text recognition provider may provide one or more recognized candidate recognition units for each recognition unit to, either, the third device or directly to the device that received the handwritten input. In this case, the third device or the device that received the handwritten input may provide one or more recognized characters, based on the candidate recognition units, corresponding to the received text input. Alternatively, the third device may split the graphemes into one or more recognition units, and provide the recognition units to the text recognition provider for generating a trained text recognition model. Accordingly, the text recognition provider may provide the recognized candidate recognition units for each recognition unit to the device that received the text input. Furthermore, more than one intermediate device may be implemented to facilitate communication between devices and a text recognition provider.

Figure 3:
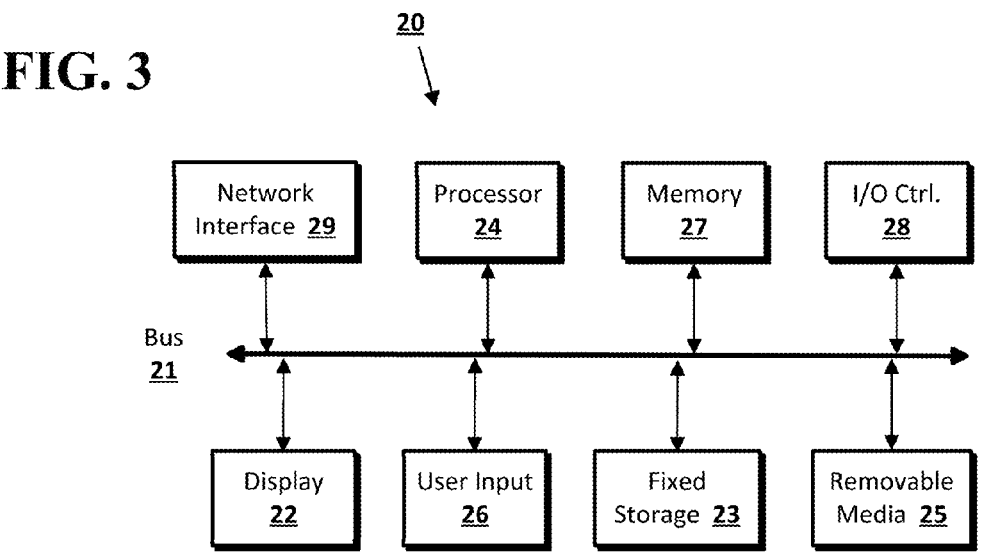
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
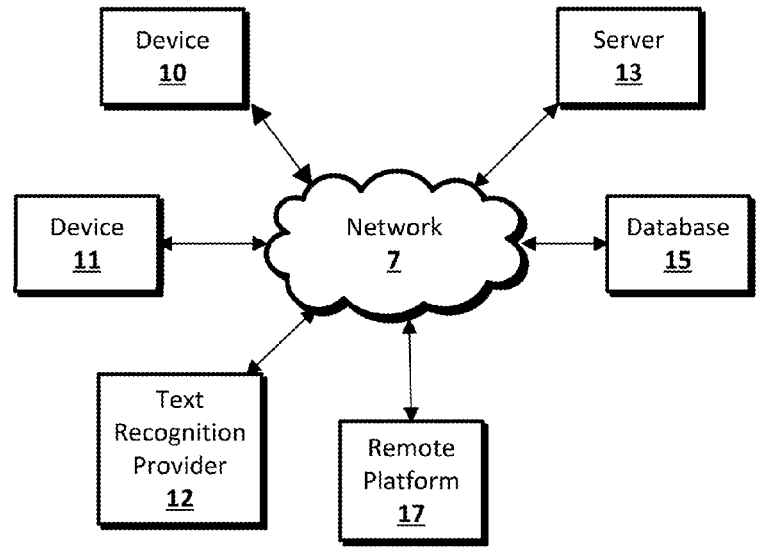
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/ or wireless networks. The clients may communicate with one or more text recognition providers 12, servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more text recognition providers 12, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. For example, while certain languages, scripts, phrases, words, and characters were chosen to illustrate the workings of the present disclosure, the teachings of the present disclosure are not so limited, and may apply to any appropriate language, script, and so on. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   receiving (i) a digital representation of text in a particular script, and (ii) a label that indicates Unicode points that correspond to the text;
   generating a set of graphemes based on the label;
   for each grapheme in the set of graphemes:
      determining a set of candidate recognition units that form the grapheme;
      selecting, from among different recognition identification criteria that are associated with different scripts, one or more recognition identification criteria associated with the particular script;
      applying the one or more recognition identification criteria associated with the particular script to the set of candidate recognition units to identify a training set of recognition units that form the grapheme; and
   training a text recognizer to separately recognize the recognition units that form the grapheme, in the training set, in subsequently received digital representations of text in the particular script.

2. The computer-implemented method of claim 1, wherein:
   the set of graphemes are generated by dividing the label; and
   the set of candidate recognition units are generated by dividing each grapheme in the set of graphemes.

3. The computer-implemented method of claim 1, wherein generating a set of candidate recognition units based on the set of graphemes comprises mapping the set of graphemes to the set of candidate recognition units, and
   wherein the mapping is based, at least in part, on a location-based context of characters in the particular script.

4. The computer-implemented method of claim 1, wherein the one or more recognition identification criteria include a frequency of occurrence of a recognition unit in the particular script or a size of a recognition unit in the particular script.

5. The computer-implemented method of claim 1, wherein the one or more recognition identification criteria include linguistic information associated with the Unicode points and are selected based on characteristics of the particular script of the received text.

6. The computer-implemented method of claim 1, wherein the digital representation of text includes one or more of handwritten text received from a user and a scanned image of one or more of handwritten text, typewritten text, and printed text.

7. The computer-implemented method of claim 1, wherein training a text recognizer to separately recognize the recognition units of the training set in subsequently received digital representations of text in the particular script comprises:
   generating a second set of candidate recognition units from the subsequently received digital representations of text in the particular script; and
   determining that the second set of candidate recognition units match the recognition units of the training set.

8. A non-transitory computer-readable storage medium encoded with a computer program, the computer program comprising instructions that, upon execution by a computer, cause the computer to perform operations comprising:
   receiving (i) a digital representation of text in a particular script, and (ii) a label that indicates Unicode points that correspond to the text;
   generating a set of graphemes based on the label;

for each grapheme in the set of graphemes:
   determining a set of candidate recognition units that form the grapheme;
   selecting, from among different recognition identification criteria that are associated with different scripts, one or more recognition identification criteria associated with the particular script;
   applying the one or more recognition identification criteria associated with the particular script to the set of candidate recognition units to identify a training set of recognition units that form the grapheme; and
   training a text recognizer to separately recognize the recognition units that form the grapheme, in the training set, in subsequently received digital representations of text in the particular script.

9. The non-transitory computer-readable storage medium of claim 8, wherein:
   the set of graphemes are generated by dividing the label; and
   the set of candidate recognition units are generated by dividing each grapheme in the set of graphemes.

10. The non-transitory computer-readable storage medium of claim 8, wherein generating a set of candidate recognition units based on the set of graphemes comprises mapping the set of graphemes to the set of candidate recognition units, and
   wherein the mapping is based, at least in part, on a location-based context of characters in the particular script.

11. The non-transitory computer-readable storage medium of claim 8, wherein the one or more recognition identification criteria include a frequency of occurrence of a recognition unit in the particular script or a size of a recognition unit in the particular script.

12. The non-transitory computer-readable storage medium of claim 8, wherein the one or more recognition identification criteria include linguistic information associated with the Unicode points and are selected based on characteristics of the particular script of the received text.

13. The non-transitory computer-readable storage medium of claim 8, wherein the digital representation of text includes one or more of handwritten text received from a user and a scanned image of one or more of handwritten text, typewritten text, and printed text.

14. The non-transitory computer-readable storage medium of claim 8, wherein training a text recognizer to separately recognize the recognition units of the training set in subsequently received digital representations of text in the particular script comprises:
   generating a second set of candidate recognition units from the subsequently received digital representations of text in the particular script; and
   determining that the second set of candidate recognition units match the recognition units of the training set.

15. A system comprising:
   one or more processors and one or more computer storage media storing instructions that are operable, when executed by the one or more processors, to cause the one or more processors to perform operations comprising:
      receiving (i) a digital representation of text in a particular script, and (ii) a label that indicates Unicode points that correspond to the text;
   generating a set of graphemes based on the label;
   for each grapheme in the set of graphemes:
      determining a set of candidate recognition units that form the grapheme;
      selecting, from among different recognition identification criteria that are associated with different scripts, one or more recognition identification criteria associated with the particular script;
      applying the one or more recognition identification criteria associated with the particular script to the set of candidate recognition units to identify a training set of recognition units that form the grapheme; and
      training a text recognizer to separately recognize the recognition units that form the grapheme, in the training set, in subsequently received digital representations of text in the particular script.

16. The system of claim 15, wherein:
   the set of graphemes are generated by dividing the label; and
   the set of candidate recognition units are generated by dividing each grapheme in the set of graphemes.

17. The system of claim 15, wherein generating a set of candidate recognition units based on the set of graphemes comprises mapping the set of graphemes to the set of candidate recognition units, and
   wherein the mapping is based, at least in part, on a location-based context of characters in the particular script.

18. The system of claim 15, wherein:
   the one or more recognition identification criteria are selected based on characteristics of the particular script of the received text; and
   the one or more recognition identification criteria include a frequency of occurrence of a recognition unit in the particular script or a size of a recognition unit in the particular script.

19. The system of claim 15, wherein the digital representation of text includes one or more of handwritten text received from a user and a scanned image of one or more of handwritten text, typewritten text, and printed text.

20. The system of claim 15, wherein training a text recognizer to separately recognize the recognition units of the training set in subsequently received digital representations of text in the particular script comprises:
   generating a second set of candidate recognition units from the subsequently received digital representations of text in the particular script; and
   determining that the second set of candidate recognition units match the recognition units of the training set.

* * * * *